Dec. 14, 1948.   T. L. JOHNSON   2,456,513
MOLDING OF HOLLOW ARTICLES
Filed April 20, 1945   2 Sheets-Sheet 1
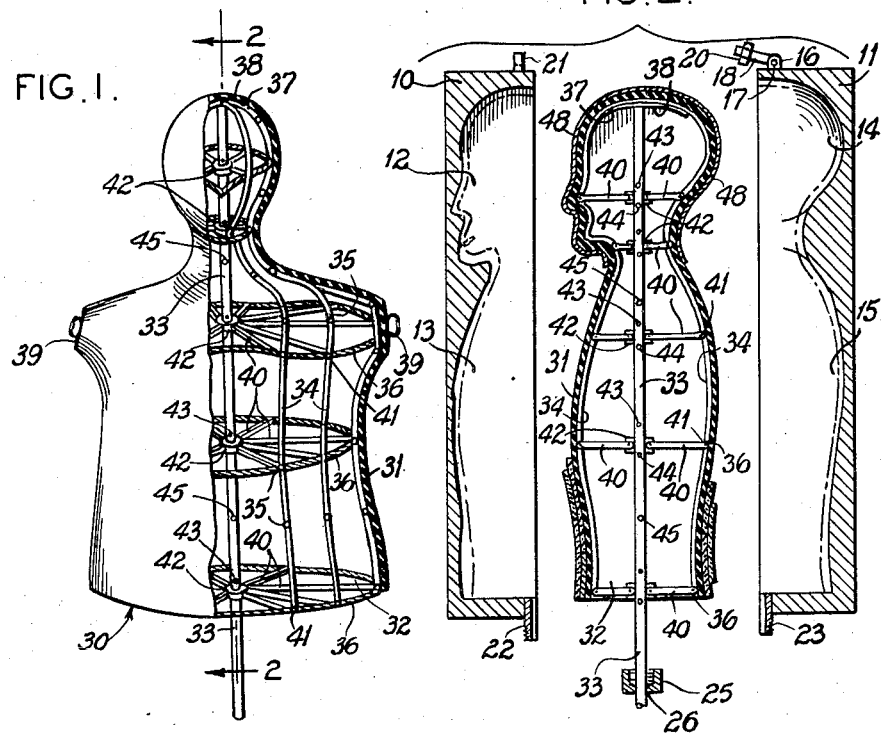
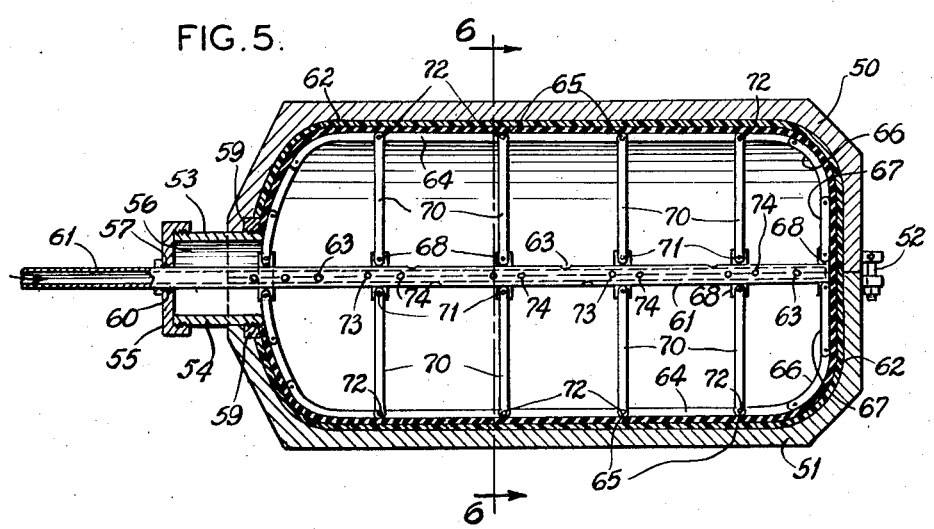
INVENTOR;
THEODORE L. JOHNSON
BY Robert R. Terry
ATTORNEY Dec. 14, 1948.  T. L. JOHNSON  2,456,513
MOLDING OF HOLLOW ARTICLES Filed April 20, 1945  2 Sheets-Sheet 2

INVENTOR
THEODORE L. JOHNSON
BY
ATTORNEY

Patented Dec. 14, 1948

2,456,513

UNITED STATES PATENT OFFICE 2,456,513

MOLDING OF HOLLOW ARTICLES

Theodore L. Johnson, St. Louis, Mo.

Application April 20, 1945, Serial No. 589,364

9 Claims. (Cl. 18—45)

This invention relates to improvements in molding hollow articles, and embraces the development of novel equipment and technique applicable to the production of hollow objects molded of thermosetting resins, especially articles formed by the use of so-called low-pressure laminates, and certain thermoplastic materials.

In the prior art certain methods of bag-molding are well known, wherein the mold cavity is constituted by and between a rigid element contoured to result in the finished article, in a particular conformity or pattern of surface, and a companion flexible molding element such as a rubber, rubberized, or rubber-like sheet material of reasonable flexibility formed into a bag or container in or to which is introduced a fluid under pressure for the purpose of application of heat and pressure to the mold cavity, hence to the article under cure. In the prevalent bag-molding practice, the extreme flexibility, and in fact the total lack of self-shaping properties of a bag or other flexible element employed in molding of this type, offers an extreme disadvantage for many purposes. For example, a fully flexible molding bag cannot, without some fluid content, be employed as a base upon which to apply a green or uncured plastic material. This has now become possible through the use of the present method and structure. Accordingly the improvements to be described have, as a general objective, a reduction in time required for, and a much greater convenience in complete molding processes which involve the use of a curing plastic material, and at the same time serve to attain an improved quality of product, particularly in the utilization of plastics of the so-called laminate types.

Yet another object of the invention is attained in provisions for mechanically erecting and similarly collapsing a molding bag element, whereby to enable laying up the uncured laminate materials on an incompletely distended flexible molding structure, and thereafter distending it fully, as by a curing fluid under pressure, in order to obtain a final phase of shaping of the uncured material and the maintenance of a suitable pressure during the curing period.

A still further important objective is attained in a greater facility for, and a reduction of cost in the molding of certain hollow articles such as mannequins in simulation of the human head, bust, torso, or other portions of the human body, as for style and garment display purposes; also in the manufacture of molded containers, artificial limbs, boats, caskets, refrigerators, furniture and many other objects characterized by a hollow interior and a partly enclosed, chambered interior.

More particularly considered with reference to production equipment for the practice of method or process involved, the invention objectively attains an improved structure for manually distending or collapsing, as desired, a flexible molding form such as a bag, and which improvements are of such nature that erection of the bag molding element may be accomplished quickly, and, following the molding period, may be as quickly collapsed to enable its withdrawl from a hollow molded article.

Further objective attainments in connection with molding equipment of the type noted include the provision of certain bag molding structures for use in and as a part of autoclaves employed in plastic molding, and of such nature that to facilitate application of the uncured plastic, a mechanically erected form or bag may be utilized as a mandrel or winding reel for the uncured plastic material.

Still further important improvements making for the success of the method and the equipment utilized, include a perfected fluid sealing arrangement through which the bag molding structure may be introduced or withdrawn to or from an autoclave assembly; the provision of an improved mechanical linkage for erecting and collapsing a bag molding unit solely by mechanical forces exerted internally thereof, and the provision of limiting means for positively determining the end point of motion applied to the bag selectively for erection and collapse thereof.

The foregoing and numerous other objects will more clearly appear from the following detailed description of certain preferred forms of structure and methods of their use, all when considered in connection with the accompanying drawing, in which:

Fig. 1 is a frontal elevation of a bag molding structure, the sheath or envelope of which is partially removed to show the interior construction;

Fig. 2 is a partly exploded view including as the center part of the figure, a vertical sectional elevation of the structure of Fig. 1 as same would appear when taken along line 2—2 thereof, together with two component portions of a rigid outer mold suitable for use with the bag-molding structure;

Fig. 5 is a longitudinal sectional elevation of a minor modification of the mold assembly, being a type utilized for producing, for example, a liquid tank.

Figure 3:
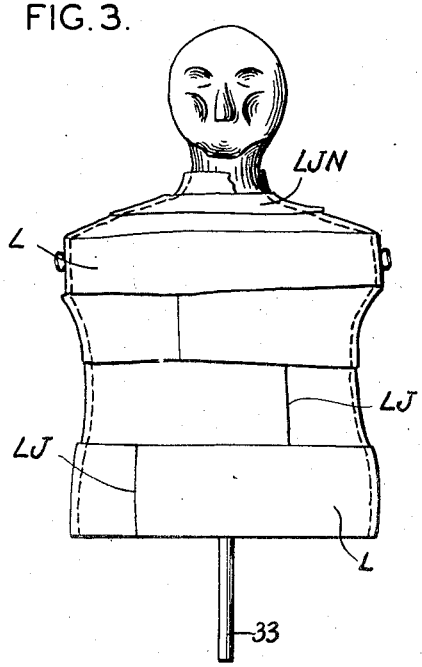
Fig. 3 is a front elevation of a bag molding unit partly covered by winding with strips of a plastic laminate, and showing the relation of parts and materials before curing.

Referring now by characters of reference to the drawing, the method and apparatus will be first described in its application to the production of a mannequin figure, such as utilized for style display purposes. For this purpose there is preferably employed what is sometimes in the plastics trade referred to as an autoclave, consisting in the present example, of a rigid outer pressure mold. In the arrangement of Fig. 2, this element may be formed of a suitable metal or in some cases of a suitable mold casting material, and its component enclosing portions divided as desired, but shown as consisting of a front half generally indicated at 10, and a rear half similarly indicated at 11. In many cases an article to be duplicated may be utilized as a pattern for casting the mold. In this practice the bag is formed to suit this cavity, with allowances for the wall thickness desired in the various zones of the finished article. The portions 10 and 11 part and meet along a longitudinal or vertical plane and their mating margins may be provided with rabbeted or tongue-and-grooved interfitting portions (not shown) so as to perfect at least a reasonable seal along the parting plane of the rigid mold components. The front half 10 of the rigid outer mold structure, is, in this example, internally conformed in its upper portion to simulate the human face and head, this patterned concavity being indicated at 12, and below which is a similar internal concave conformity 13 corresponding generally to the frontal portions of the torso including the bust region. The mold component 11 is likewise internally conformed in simulation of the rear head portion, as at 14, and a rear torsoforming portion 15. Provision may be made for attaching and separating the mold components in any suitable manner, but this is conveniently and simply provided for through a projecting apertured lug 16, carrying a pivot 17 for a swing bolt 18, and the latter provided with a nut 20. A recessed lug 21 is carried by the companion mold half, the recess of which receives the shank of bolt 18 behind nut 20 so that the parts are tightly drawn together as the nut is threaded up after bringing the mold components into operative relation.

In what may be termed the lower portion of the rigid mold structure, each of the component rigid elements 10 and 11 is provided with a semi-cylindrical externally threaded element which may, for example, be welded to the adjacent transverse or lower wall element of the rigid structure. These half cylindrical portions 22 and 23, respectively, are provided with suitable edge sealing means (not shown) and the external threads thereon when the mold components are together, serve to receive an internally threaded cap 25, the latter engaging the threads of the members 22 and 23 in reasonably fluidtight relation. The cap is provided with a central or axial opening 26 which is provided with a packing ring or the like for the purpose of sealing this opening around a tubular stem, later to be described, and adapted to project through the opening 26.

The present method and apparatus are designed particularly for molding and curing thermosetting and thermoplastic materials, yet more particularly, that class of resinous materials which are referred to in trade as low-pressure laminates. Certain of these products, while exhibiting very valuable physical characteristics in the cured and molded article, are characterized by a tendency to shrink somewhat in the course of the curing or heating phase incident to molding. Particularly for this reason, and when utilizing materials of this class, the technique to be described is predicated on a continuingly expansible or distensible fabric structure such as a bag for example, constituting, as shown, an inner mold element, cooperating with the outer rigid mold structure to form the mold cavity.

As an expansible inner mold element or bag, there is generally indicated in Figs. 1 and 2, a structure 30. This is comprised of a shaped outer envelope or sheath 31 which is flexible, susceptible of stretch in either of two major directions and may be formed of sheet rubber, a suitable sheet plastic material, or advantageously for some uses, of a stretchable fabric suitably impregnated to render it fluid-tight. In the present example the sheath 31 consists in part of a major torso and bust portion, including partial shoulder conformities, together with relatively reduced portions serving to mold a figure in simulation of neck and head portions in the finished mannequin. The sheath 31 may be imperforate except for a bottom opening 32 (Fig. 2), and is importantly provided internally with a mechanical linkage structure through which the bag may be erected or distended to a definite size and dimensions. Similarly this linkage structure provides for a positive manipulative mechanical collapse of the sheath, and hence of the whole bag structure, at the termination of the molding and curing period, and prevents excessive stretch or distortion of the bag.

Proceeding now to describe the articulated skeleton arrangement by which the manual approximate erection, and when desired, the collapse of the bag, are accomplished, there is provided longitudinally, approximately axially of the bag, and over the full length thereof and extending therebelow, a stem or rod 33. Extending longitudinally and conformably along the inner surface of the sheath 31 is a series of brace or rib elements 34. These are pivotally jointed at intervals, as at 35. Extending at approximately a right angle, say horizontally of the internal surface of the form, are several series of flexible elements 36, those in each series being connected to each other and connected to the longitudinal braces 34. The members 36 may in fact be advantageously formed of light steel cable or plastic cords, and in a given series or circle, may be continuous. These may if desired be formed in the bag wall. The cable elements thus formed, serve as tension members when the bag is distended, and serve to prevent longitudinal valleys between ribs 34, as well as aiding in attaining a full and correct contouring of the bag, and in bringing it to a definite size and shape prior to introduction of fluid pressure thereto. In an irregularly shaped bag as shown, it will appear as obvious that the circles collectively formed by the horizontal members 36, are of varying diameters, the smallest in the current example being that in the neck region of the mannequin. It is a further preference to extend some of the vertical brace elements, such as 34, as in the head region of the structure, so as to form what may be termed end braces 37, and thereabove may be desirably provided a suitable reinforcing plate 38, carried by the end of element 33. It has also been found advantageous to employ in each shoulder region, a plate structure 39, which improves shaping in this zone, and which includes a socket portion to facilitate attachment of arms to the torso when desired.

Figure 4:
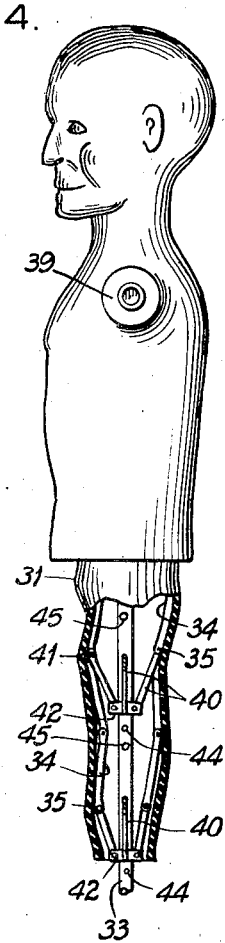
Fig. 4 is a side elevation of a molded mannequin in simulation of the upper human torso and head, and showing the manner of withdrawal from the now-molded object, of the collapsed molding bag structure, the latter being partly broken away to show the relation of parts of the mechanical linkage therein.

Preferably corresponding to the number of series of the horizontal bands or circles 36, is a series of groups of radial toggle arms 40. Each of these is pivoted at its outer end as at 41, and near the juncture of adjacent elements 36, and each of the radial elements is pivoted at its inner end, to a movable collar 42. Each of the collars of the several series now in discussion, is slidably disposed along and is carried by the stem or rod 33. The rod is movable with respect to the collars in an axial direction, for mechanicaly distending the bag, or selectively for mechanically collapsing it, through the provision of a series of pins related in pairs along the rod or tube 33 but spaced apart a distance greater than the thickness of the collar 42 therebetween. As will now appear from Fig. 2, in noting any given collar, the pin 44 is in engagement with the collar 42, while the pin 43 is spaced somewhat above or beyond the collar. Thus by positioning the stem 33 as shown by Fig. 2, the toggle linkages constituted by the radial links 40 are kept in centered or bag-distending positions. When, however, it is desired to collapse the bag, a sharp downward movement of the stem will first bring the pins 43 in impacting engagement, each with the nearest collar, with the effect of upsetting or breaking the several toggle joints, and mechanically effecting a collapse of the bag. This relation of the parts is best shown by Fig. 4 which shows the bag element partly broken away and the parts of the linkage as they would appear with the bag in collapsed position.

It is a preference to form the stem or rod 33 of tubular construction so as to introduce therethrough a molding and curing fluid under pressure. From a suitable source (not shown) steam, for example, may be directed through the tube 33 and will find its exit to the interior of the bag through a suitable number of steam-discharge ports 45.

Although in view of the preceding description of parts and general recitals of purpose, the operations incident to molding, by the present method and apparatus described, will have become apparent, it may be noted for completeness that the uncured laminate may be introduced over the bag for example by utilizing the bag structure as a mandrel or reel and winding a strip laminate thereon. In such case it has been found convenient to employ the mechanically distended bag as the mandrel, and its stem, shaft or tube 33 as an axis for the bag when so utilized. With this procedure, the rotation for purposes of winding the strip or sheet laminate on the mannequin form, may be accomplished by connecting the stem 33 to a suitable horizontal power shaft, and by providing a journalling support (not shown) for the element 33. A heating fluid may be supplied through element 33, as is advisable in certain cases, while laying up the uncured material on the bag. The strip material is now wound over the mechanically erected bag until the requisite depth of material is laid up on the bag, it being understood that this depth may vary in different zones of the bag.

In this stage of the process, the bag with the strip laminate thereon will appear substantially as shown by Fig. 3, wherein the strips of laminate are indicated at L and the joints or breaks between the strips indicated at LJ. Strips or sheets of varying width may be utilized for example, in more restricted widths for the narrower neck portions indicated at LJN, and for better conformity, narrower or differently shaped lengths or even pulped or bulk materials may be applied to the head portion of the mannequin, all as will now be well understood. It will be obvious that in molding by the use of laminate "lay-ups," it is difficult so to apply these materials as to avoid wrinkling, folding, and other irregularities. It is accordingly suggested that, following applicant's practice, the laminates be "tailored" for best conformity to any irregular or complicated object. The materials can then be accurately laid upon a truly formed, stabilized bag. Such cutting or shaping enables a fit of the laminates to obtain the required depth of thickness of material, whether wet or dry laminate lay-ups be employed.

Substantially the same steps as those described may be followed in utilizing thermosetting or thermoplastic materials of other than strip or sheet form; for example, a pulped or other formless body of the green material may be applied exteriorly of the bag either while stationary or in rotation to facilitate such application. Whichever practice is followed, upon application of the desired depth of uncured plastic, the now covered bag is brought to a vertical or other desired position, and the two halves of the rigid mold structure 10 and 11 are brought together in the proper relation to effect a substantial matching of the convex and concave mold-cavity-defining elements. The rigid mold halves are connected, as through the swing bolt 18 at one end, and at the other end, by bringing into juxtaposition the elements 22 and 23 with application of the cap 25 through the axial opening 26 of which projects the tubular stem 33. It is not absolutely indispensable that the curing fluid be supplied through stem 33, nor that the latter consist of a tubular element, although this arrangement has been found simple and expeditious, and is accordingly preferred.

Assuming now that the autoclave has been fully assembled, steam or other curing fluid is admitted to the interior of the bag assembly. The skeletal bag erecting linkage described is so designed that, after the manner of an ordinary umbrella for example, the flexible sheath thereof is rendered reasonably taut. However the effect of admission of fluid under pressure will, as now obvious, serve still further to distend the sheath 31, and since the bag is flexible, will serve to impart the fluid pressure from the interior of the bag, directly to the plastic occupying the mold cavity. For this reason, an accurate temperature control of the material in the mold cavity, is maintained throughout the cure as by thermostatic control of the fluid admitted through element 33.

After the determined period of molding, either of two procedures may be followed, viz., the bag is relieved of its pressure, and the rigid mold components 10 and 11 may then be separated and removed from the now molded and cured figure overlying the bag. The bag and molded figure such as a mannequin, may then be separately handled by breaking connections to tube 33, following which the bag structure may now be mechanically collapsed merely by manipulating outwardly and axially, the stem 33. As soon as collapsed, the bag structure is readily withdrawn. At this stage of the method, this step of withdrawing the now collapsed bag structure will result in the parts of the bag being substantially as indicated by Fig. 4. Alternately, an order of events, sometimes preferable depending upon the nature of the molded article, consists in first releasing fluid pressure, then collapsing the bag structure and removing same through the vestibule afforded by the companion elements 22 and 23, following removal of the cap 25 and disconnection of stem 33, all prior to separation of the rigid mold components 10 and 11.

A step in addition to those described, involving a minor addition of structure, may be advantageously employed for strengthening certain irregularly shaped articles, or parts thereof. It is a preference in forming, say a head mannequin, or the head portion of the more complete unit shown, to provide a stretchable sleeve of knitted or woven fibrous material, which is shaped to fit over the formed stabilized bag, under, preferably, a slight tension, and of such nature that it is distensible in at least two directions. As an example: a knitted glass fiber "stocking," such as shown at 48, may be drawn over the erected or stabilized bag, and gives a uniform dispersal of the fiber so that maximum strength is attained. In this case resin impregnation would take place after the knitted form is drawn over the stabilized or erected bag mold element, and if desired, a plurality of the knitted forms might be employed. In the example of Fig. 2, the knitted form extends over only the head and neck portions of the bag, and of course remains within the molded article after collapse and removal of the molding bag 30.

Figure 6:
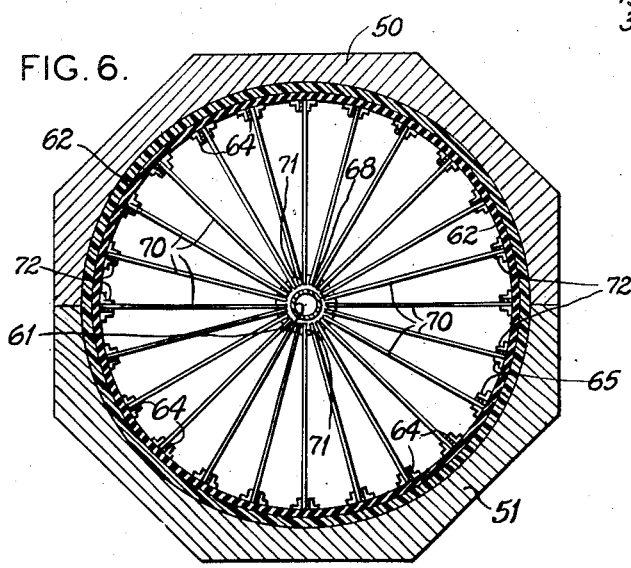
Fig. 6 is a transverse sectional view as taken along line 6—6 of Fig. 5.

The described method and the general arrangement of apparatus heretofore referred to as utilized for the production of hollow objects in simulation of portions of the human figure, as mannequins for example, may also be followed in the production of many more simple hollow molded forms or products and others of even more complicated structure. In order to illustrate the feasibility of the present practice as adapted to a substantially cylindrical water tank for example, the arrangement and structure illustrated by Figs. 5 and 6 are employed. In this arrangement, a preferred form of autoclave includes two companion rigid outer mold elements 50 and 51 which are conveniently assembled for molding purposes at one end or the top (if vertical), by a swing bolt arrangement 52 which may be similar in principle and structure to the fastening 18—21 heretofore described. At the opposite end of the rigid mold structure are provided a pair of semicircular vestibule-forming portions 53 and 54. When the mold is operatively assembled, an internally threaded element such as a screw cap 55 threadedly engages the exterior outer end of the vestibule structure in which an antechamber 56 is formed. The two-part antechamber or vestibule structure 53—54 may be secured in any suitable manner as by a threaded retaining ring 59, or by welding, to the outer mold elements 50 and 51. The cap 55 is provided with an axial opening 57 in which is disposed a packing ring 60 so as to seal this end zone in the region where the erecting and collapsing stem 61 extends therethrough. By preference the stem 61 is tubular, and within the bag or sheath 62 are provided a plurality of fluid emission ports 63 for the admission of a curing fluid such as steam under pressure, and which also provides the requisite and predetermined molding pressure within the bag.

The general principles of structure and arrangement of collapsible skeleton frame work, utilized for distending and collapsing the bag mold element, are similar to the assembly heretofore described in connection with Figs. 1 and 2. In the modification, there are provided a series of longitudinal, jointed frame elements 64. These are, by preference, intermediately pivotally connected links, being pinned and thus jointed to each other in some or all of the intermediate zones 65 and are extended into curved end portions or links 66, each connected through, and into a link 67 a group of which pivotally engages an end collar 68. A series of similarly spaced intermediate collars 68 slidably engage and surround the stem or tube 61 except for the end collar at or near the imperforate end of the bag, being at the right hand end (Fig. 5). This unit is preferably axially fixed to the stem 61.

An operative connection in the nature of a plurality of radial arms arranged in the manner of toggle link elements, are shown in the drawing as arranged in four series or groups, the individual radial links being indicated at 70. Each link 70 is pivoted to one of the collars, as at 71 at the inner end of the link, and at the outer end of the link similarly pivoted at 72 to one, or between two of the pivotally connected longitudinal elements 64.

In a manner generally similar to the structure of Figs. 1 and 2 above described, there is preferably provided a lost-motion actuating connection between the axially reciprocable stem or tube 61, and each of the several collars 63 except the last such collar adjacent the imperforate end of the bag. This arrangement as earlier noted, consists of a pair of stop pins 73 and 74, one such pair being provided for each of the intermediate collars so as to provide a lost-motion collapsing and distending connection between the stem and each of the several collars. In the erected condition of the skeleton frame as shown by Fig. 5, the tubular stem 61 has been forced to its innermost position in the bag, in which the several pins 73 which extend through the tube 61 and on each side thereof, abut the adjacent collars 68. When it is desired to collapse the frame work for withdrawing the bag, it will now be obvious that the tube 61 is enabled to have a slight movement to the left (Fig. 5) prior to the time when the opposite pins 74 come into abutment, each with its adjacent intermediate collar 68, it being noted, as before, that the center spacing of the paired pins 73—74 somewhat exceeds the thickness or depth of the adjacent collar 68. In the position of parts as shown by Fig. 5, the radial links 70 are related to the stem and to the longitudinal bracing elements, as a centered toggle structure, so as to hold the sheath of the bag in a distended and at least moderately tensioned condition.

In the present structure, as in the structure of Figs. 1 and 2, it may be desired for certain types of service, to secure certain of the peripheral frame work links or elements to the fabric or sheeting constituting the sheath or envelope of the bag. This may be done by internally projecting fabric tabs (not shown), stitched or cemented to the inner surface of the envelope material.

The manner of usage of the modified structure of Figs. 5 and 6 will now have become apparent from the description and method practiced in connection with the structure of Figs. 1 and 2 since it need deviate but little, if any, from that heretofore described.

Briefly to review the preferred practice involved in the modification, it may be noted that with the bag element free of the remainder of the autoclave, the axial tubular stem 61 is actuated to center the several toggle linkages internally of the bag and thus mechanically to distend the bag. Assuming one of the resins of socalled laminate type (or a combination of several) is to be utilized, the now distended molding bag, brought to definite size, is disposed with the stem 61 arranged as a mandrel shaft in suitable journals therefor (not shown) and is coupled to a suitable power shaft for relatively slowly rotating the mechanically distended bag, which may also be under some fluid pressure. It is a preference in both forms, particularly for the utilization of certain types of plastic material, to provide a somewhat roughened exterior sheath surface, whereby to promote initial adhesion of the plastic to the surface of the bag, and yet without substantial penetration of the uncured plastic in any manner to interfere with freedom of removal of the bag from the article after molding. The plastic may be applied to the rotating (or stationary) mechanically distended bag to a requisite depth of material according to desired thickness of wall of the hollow molded article, then "tailored" as necessary. The bag, now surface charged or loaded with the uncured material, is assembled interiorly of the rigid mold structure 50 and 51, the two parts of which are preferably separated for such purpose, and afterwards, the rigid mold elements assembled together, as described above, about the now loaded bag. The completely assembled mold and contents are suitably supported, and a fluid connection established from a source of fluid under pressure such as steam, directed interiorly of tube 61, whence it issues from ports 63 to the interior of the molding bag, serving still further and to final predetermined limits, to distend the bag and at the same time provide the desired molding pressure on the contents during cure.

At the conclusion of a predetermined molding period, the steam or other fluid under pressure is shut off from tube 61, pressure in the bag is released, and the skeleton framework, hence the bag, is collapsed, and may be withdrawn through the antechamber 56 after removal of cap 55, or optionally, the outer rigid mold elements 50 and 51 dissassembled, removed from the hollow molded article, and the bag thereafter collapsed and removed from the molded object.

Many optional refinements are well known to those skilled in the art and are not, in the interest of brevity, included in the present description. These include precision temperature and pressure controls; provision for regular removal of condensate if required and desired, and a provision according to operator preference, in providing for a two-way circulation (i. e. in and out) of the heating and curing fluid. None of these items of adjunctive equipment is disclosed since, as such, they may be readily obtained in trade and applied as desired.

It will now have appeared that the improvements described afford an extremely versatile and adaptable method which may be utilized in production of a wide variety of articles, principally but not exclusively those of substantially completely enclosed hollow characteristics, and that the invention in all respects serves fully to attain each of the objectives hereinabove enumerated and numerous others which suggest themselves from a study of the present structure and technique.

The present improvements are applicable to many fields of production, including certain molding processes not necessarily involving heat curing, or thermally-effected polymerization. The current developments, while thus widely applicable, are of particular advantage in molding thermosetting and thermoplastic resins, it being noted that the term "thermoplastic" is herein used in its broad sense as inclusive of the socalled thermosetting materials and other heatcured plastics, without intended limitation.

Although the invention has been described by making detailed reference to but a few exemplary embodiments, the detailed description should not be taken as restrictive of its possibilities, since numerous variants both in practice and structure, may be made within the intended scope of the claims hereunto appended.

I claim as my invention:

1. The described method of molding in a mold cavity and concurrently thermally treating a plastic material, between companion rigid and flexible mold elements, which consists in structurally bracing the wall portions of the flexible element to a degree to cause a slightly subnormal distention thereof while located exteriorly of the mold cavity, winding predetermined lengths of the material to be molded, about the flexible mold element, introducing the flexible element carrying the material to be molded, to the cavity, conducting a temperature controlling fluid under pressure and into contact with the flexible element, and thereby controlling the temperature of the mold cavity through heat exchanging action of the heating fluid with the plastic material, and thereby more fully distending the flexible mold element substantially throughout the molding period, then withdrawing the heating fluid, relieving the flexible element of structural bracing, positively withdrawing the walls of the flexible element from a molding position and away from the molded article, and removing the molded article.

2. The recited method of bag-molding a plastic material to form a hollow article, which consists in defining a mold cavity internally of an internally conformed mold assembly, and a molding bag characterized by a defined axis and spaced internally of said assembly, which consists in internally bracing the bag against endwise as well as transverse collapse by partially and mechanically distending the bag, displacing the bag about its axis, and during such displacement applying the material to be molded in overlying relation to the bag, then introducing same to the cavity of the rigid mold assembly, and introducing to the interior of the bag element a temperature controlling fluid, utilizing said fluid for the purpose of more fully distending the bag element, controlling the temperature of the material to be molded by heat exchange between said fluid and the mold cavity contents, and after molding, mechanically collapsing the bracing structure internally of the bag, removing said fluid from the bag, positively retracting the bag walls by manipulative contraction in both longitudinal and transverse directions, and removing the molded article from the mold cavity.

3. The described method of bag-molding a hollow object of a plastic resinous material, which includes the steps of mechanically distending a bag element by both lengthwise and transverse enlargement thereof to a degree to approach internal mold cavity dimensions, rotating the bag element while applying a molding material over the bag, introducing the bag and material to a rigidly defined cavity, introducing a curing fluid under pressure to the interior of the bag to establish a curing pressure and thereby more fully distending the bag, curing and molding the material under pressure in the cavity, relieving the bag of its internal pressure and fluid, and mechanically collapsing the bag to retract it from the molded object.

4. The method and steps recited by claim 3, but further characterized in a distinct sequence of separate steps involving, prior to curing, a first stage of incomplete distention of the bag by solely mechanical means followed by a complete and maximum distention of the bag by application of fluid under pressure internally thereof.

5. The described method of bag-molding a thermoplastic material to form thereof a hollow object, which consists in internally and mechanically but incompletely distending a flexible bag or form by both endwise and crosswise bracing same, winding on said form the green thermoplastic material in the shape of a strip or strips, inserting the bag, with the strip material wound thereon, into a rigid mold, then distending the bag to maximum proportions by introducing a curing fluid thereto under pressure and at a temperature suitable for curing; following the curing and molding period evacuating the bag of the curing fluid, positively retracting the walls of the bag from the surface of the molded object while the object remains in the mold, as by mechanically collapsing the bag away from the molded object, and removing the molded object.

6. A molding bag for elongate hollow articles, including an imperforate flexible sheath or envelope, a skeletal frame work of jointed elements within and certain of which are attached to the sheath, a tubular element disposed along the axis of the bag and operatively connected to said jointed elements, and extending exteriorly of the bag, the axis element and jointed elements being arranged and connected to enable a selective, collapsing and distending manipulation of the skeletal frame work while the molding bag is in molding position, the tubular element adapted for connection to a source of fluid under pressure, and being ported to distribute a pressure fluid interiorly of the bag.

7. In an elongate autoclave for molding and curing hollow articles of a thermoplastic material, an outer mold structure of rigid construction, an inner mold structure comprised of an elongate curing bag closed but for a neck opening, a skeletal frame work of rigid elements within the bag including a plurality of radial elements, an elongate element disposed axially of the bag and extending outwardly through the neck opening, and being operatively associated with the inner ends of said radial elements in a manner to enable therethrough, distention and collapse of the bag through actuation of the axial element, an outer rigid mold element coacting with the bag structure to constitute a molding cavity, means including said axial element for supplying a curing fluid to the interior of the bag, and a fluid-tight antechamber or vestibule beyond but communicating with one end of the mold cavity, and through which said axial element extends and through which the curing bag, when collapsed, may be withdrawn, the axial element being adapted for connection to a source of curing fluid and being of tubular form to conduct the curing fluid from a source through the antechamber thence through the neck opening and to the interior of the bag.

8. The combination and arrangement of elements as recited by claim 7 but further characterized in that the bag is provided with a roughened external surface, and the internal rigid skeletal elements within the bag include a series of such elements articulately joined to and aligned with others extending longitudinally of the bag, and other such elements extended substantially radially of the bag, certain of said elements being secured to the flexible material forming the sheath of the bag element.

9. In an assembly for use in bag-molding a thermoplastic material to constitute thereof a hollow elongate molded article, an inner curing bag assembly in the form of an envelope fully closed but for a reduced neck opening at one end, the bag assembly conforming in external shaping to the internal shaping of the article to be molded, means externally confining the article to be molded, the bag being of elongate form and characterized by a defined longitudinal axis, a series of toggle-jointed links within the bag with certain of the links connected to the walls of the bag and arranged when the toggle joints are broken, to collapse the bag, and when erected, to distend the bag both in longitudinal and radial direction, and an axial tubular stem within the bag but extended outwardly of the said neck opening and having a lost-motion connection with said toggle linkage whereby to enable manual, mechanical distention of the bag and selective mechanical collapse of the bag from a point exterior thereof, means for introducing a curing fluid through the tubular stem to the interior of the bag, and means providing a fluid seal to prevent escape of curing fluid about the stem, in the zone of its projection beyond the bag.

THEODORE L. JOHNSON.

REFERENCES CITED

The following references are of record in the file of this patent:

UNITED STATES PATENTS

| Number | Name | Date |
| --- | --- | --- |
| Re. 13,106 | Clark | Apr. 19, 1910 |
| 720,718 | Maddock et al. | Feb. 17, 1903 |
| 1,017,876 | Landis | Feb. 20, 1912 |
| 1,076,681 | Levine | Oct. 28, 1913 |
| 1,114,758 | Haskell | Oct. 27, 1914 |
| 1,289,109 | Burns | Dec. 31, 1918 |
| 1,312,157 | Buente | Aug. 5, 1919 |
| 1,428,201 | Andrews | Sept. 5, 1922 |
| 1,497,190 | Moland | June 10, 1924 |
| 1,800,360 | Schroeder | Apr. 14, 1931 |
| 1,910,128 | Semler | May 23, 1933 |
| 2,100,627 | Buey et al. | Nov. 30, 1937 |
| 2,202,042 | Blount | May 28, 1940 |
| 2,204,383 | Safford | June 11, 1940 |
| 2,315,634 | McCall | Apr. 6, 1943 |
| 2,374,386 | Shakesby | Apr. 24, 1945 |